United States Patent [19]

Saruwatari

[11] 3,919,966

[45] Nov. 18, 1975

[54] CHANNEL INDICATOR

[75] Inventor: Shigeto Saruwatari, Chigasaki, Japan

[73] Assignee: Matsushita Electric Industrial Co., Ltd., Osaka, Japan

[22] Filed: Dec. 14, 1972

[21] Appl. No.: 315,079

[30] Foreign Application Priority Data

Dec. 17, 1971 Japan ........................ 46-120035[U]

[52] U.S. Cl........ 116/124.1 A; 116/DIG. 29; 334/86

[51] Int. Cl.$^{2}$ ............................................ H03J 1/02

[58] Field of Search... 116/124.1 R, 124.1 A, 124.3, 116/DIG. 29; 242/71.2, 57; 235/71 R; 334/86

[56] References Cited

UNITED STATES PATENTS

| | | | |
|---|---|---|---|
| 2,170,398 | 8/1939 | Caldwell | 235/71 R |
| 2,673,500 | 3/1954 | Cassidy et al. | 242/71.2 X |
| 2,746,419 | 5/1956 | Serge | 116/124.1 |
| 2,931,333 | 4/1960 | Whittier | 116/124.1 R |
| 2,942,108 | 6/1960 | Goldstein et al. | 116/124.1 X |
| 3,109,250 | 11/1963 | Hill | 40/31 |
| 3,187,713 | 6/1965 | Fenwick | 116/124.3 |
| 3,422,687 | 1/1969 | Krepps, Jr. | 74/10.8 |
| 3,440,998 | 4/1969 | Lumb | 116/124.1 R |

*Primary Examiner*—Richard C. Queisser
*Assistant Examiner*—Daniel M. Yasich
*Attorney, Agent, or Firm*—Burgess, Ryan and Wayne

[57] ABSTRACT

A channel indicator is provided in which a channel indicating tape upon which are printed a plurality of codes each representing a channel member is wrapped around a pair of drivingly coupled rotary drums one of which is drivingly coupled to a channel selection shaft of a detent type tuner. The channel indicator is extremely simple in construction and compact in size yet capable of indicating a large number of channel numbers.

5 Claims, 3 Drawing Figures

CHANNEL INDICATOR

BACKGROUND OF THE INVENTION

The present invention relates to a channel indicator for use in a television receiver.

In the conventional channel indicator for a television receiver, one of a plurality of channel numbers marked equiangularly upon a dial or disk carried by a channel selection shaft of a tuner is viewed through an indicating window formed through a front panel of a television receiver. However a number of channel numbers marked on a dial or disk is limited so that the prior art channel indicator of the type described is not suited for use with detent type VHF-UHF tuners which have been recently widely used in television receivers such as the timer found in U.S. Pat. No. 3,774,459.

SUMMARY OF THE INVENTION

The present invention therefore has for its object to eliminate the defect encountered in the prior art channel indicators and to provide a channel indicator which is extremely simple in construction and compact in size yet capable of indicating a large number of channel or station numbers.

Briefly stated according to the present invention a channel indicating tape upon which are printed a plurality of channel or station numbers is wrapped around a pair of drivingly coupled rotary drums one of which in turn is drivingly coupled to a channel selection shaft of a detent type tuner.

DESCRIPTION OF THE PREFERRED EMBODIMENTS

Figure 1:
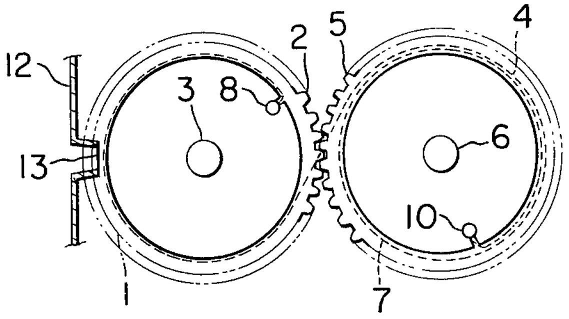
FIG. 1 is a top view of a first embodiment of a channel indicator in accordance with the present invention.
Figure 2:
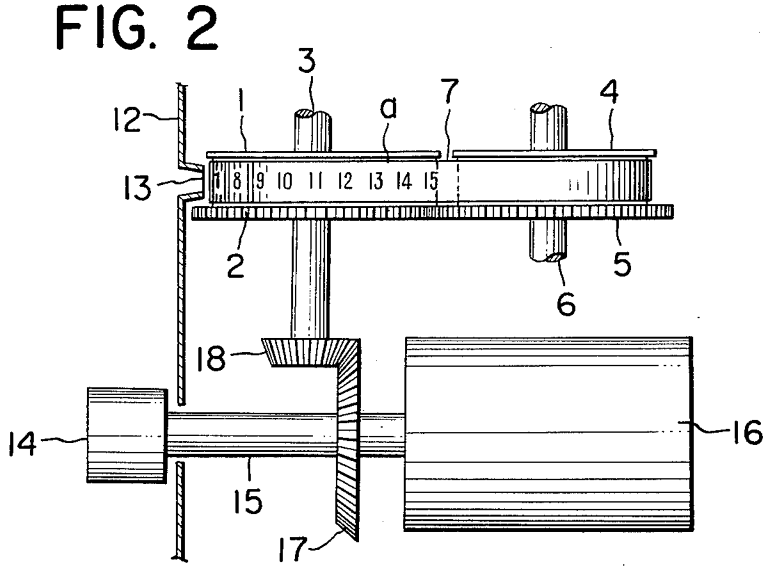
FIG. 2 is a side view of the embodiment shown in FIG. 1.

First Embodiment, FIGS. 1 and 2

Referring to FIGS. 1 and 2, a rotary drum 1 which is carried by a rotary shaft 3 has a toothed wheel 2 formed integral with the lower major surface of the rotary drum 1. A rotary drum 4 carried by a rotary shaft 6 is similar in construction to the rotary drum 1 and has a toothed wheel 5 which is in mesh with the toothed wheel 2 of the rotary drum 1. The two rotary drums 1 and 4 are coupled by a tape 7.

The tape is wound around drum 1 in a counterclockwise direction, and around drum 4 in a clockwise direction, bridging the two drums tangentially. The tape 7 is a channel or station indicator upon which a plurality of channel numbers *a* are printed in an equidistantly spaced apart relation. One end of the tape 7 is securely fixed to the rotary drum 1 with a pin 8, whereas the other end is securely fixed to the rotary drum 4 with a pin 10. A channel indicator window 13 is formed through a front panel 12 of a television receiver. A tuner shaft 15, which extends from a detent type tuner 16, has a channel selection knob 14 fixed securely at one end thereof and carries a bevel gear 17 in mesh with a bevel gear 18 fixed to the lower end of the rotary shaft 3. Such a detent tuner is illustrated in U.S. Pat. No. 2,942,108.

When the knob 14 is rotated to select a desired channel or station, the rotation of the tuner shaft 15 is transmitted through the pair of bevel gears 17 and 18 to the rotary shaft 3 and hence the rotary drum 1. Therefore both the rotary drums 1 and 4 are rotated so that the selected channel or station may be viewed through the window 13.

When the rotary shaft 3 and hence the rotary drum 1 rotates in the clockwise direction in FIG. 1, the rotary drum 4 rotates in the counterclockwise direction. Therefore the channel indicating tape 7 is wound around the rotary drum 1. On the other hand when the rotary shaft 3 and hence the rotary drum 1 rotates in the counterclockwise direction, the rotary drum 4 is rotated in the clockwise direction so that the channel indicating tape 7 is wound around the rotary drum 4. Thus the channel or station numbers may be successively displayed one by one through the window 13.

Since the channel indicating tape 7 may be wound around the rotary drums 1 and 4 many turns, a considerably large number of channel or station numbers may be displayed. Therefore the channel indicator, in accordance with the present invention, may indicate not only the VHF channels but also UHF channels when it is used in conjunction with a detent type VHF-UHF tuner.

Figure 3:
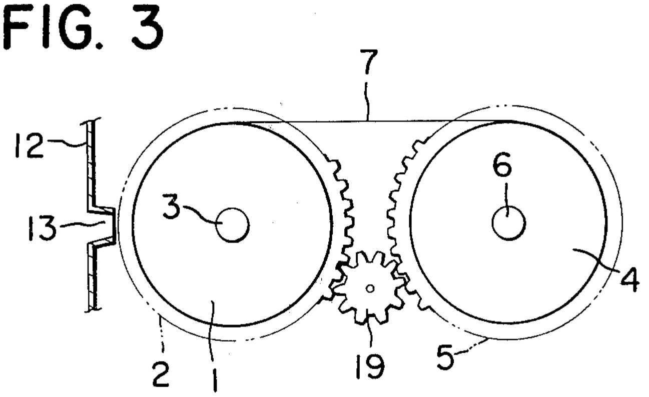
FIG. 3 is a top view of a second embodiment of the present invention.

Second Embodiment, FIG. 3

In the channel indicator shown in FIGS. 1 and 2, the channel indicating tape 7 is shown as being wrapped around the rotary drums 1 and 4 in the form of S, but in the second embodiment shown in FIG. 3, the channel indicating tape 7 is wrapped around the rotary drums 1 and 4 not in the form of S, because an idle gear 19 in mesh with the toothed wheels 2 and 5, and interposed between the rotary drums 1 and 4, so that the drums may rotate in the same direction.

What is claimed is:

1. A channel indicator having a channel selection shaft in detent-type tuner for use in a television receiver comprising a first rotary drum provided with an axially aligned shaft and a peripheral frictional engagement surface, a second rotary drum provided with an axially aligned shaft and a peripheral frictional engagement surface, said peripheral frictional engagement surfaces of said first and second rotary drums being frictionally engaged with each other, a pair of intermeshing gears, means for transmitting a rotation of said channel selection shaft to one of said first and second rotary drums by means of said pair of intermeshing gears, each gear of said pair of intermeshing gears being directly coupled to one of said axially aligned shafts of said one of said first and second rotary drums and to said channel selection shaft, respectively, a channel indicating tape upon which a plurality of codes representing channel numbers are printed in equidistantly spaced-apart relation, one end of said tape being fixed to said first drum and the other end of said tape being fixed to said second rotary drum, said tape being wound around at least one of said drums a plurality of turns, said peripheral frictional engagement surfaces of said drums being spaced from said surfaces about which said tape is wound, an indicating window formed in said television receiver for indicating one of said plurality of codes and provided in close proximity to the surface of said channel indicating tape wound around the first drum so as to make one of said plurality of codes easily visible, and means for indicating a channel number representing a selected channel of a plurality of channel indicating codes visible in said indicating window at every selected stop position of said channel selection shaft of said detent-type tuner.

2. A channel indicator as defined in claim 1, wherein the peripheral frictional engagement surfaces of said first and second drums are in intimate contact.

3. A channel indicator as defined in claim 1, further comprising an idler wheel intimately contacting the frictional engagement surfaces of said first and second drums, whereby said first and second drums are frictionally engaged through said idler wheel.

4. A channel indicator for use in a television receiver comprising a first rotary drum provided with an axially aligned shaft and a plurality of peripheral gear teeth integrally formed with said first rotary drum, a second rotary drum provided with an axially aligned shaft and a plurality of peripheral gear teeth formed integrally with said second rotary drum, said peripheral gear teeth on said first and second rotary drums being in mesh so that the first and second rotary drums rotate in opposite directions, a detent tuner provided with a channel selection shaft having a stop position corresponding to each television channel, a second pair of intermeshing gears, a means for transmitting a rotation of said channel selection shaft to one of said first and second rotary drums by means of said second pair of intermeshing gears, each gear of said second pair of intermeshing gears being directly coupled to one of said axially aligned shafts of said one of said first and second rotary drums and to said channel selection shaft, respectively, a channel indicating tape upon which a plurality of codes representing channel numbers are printed in equidistantly spaced-apart relation, one end of said tape being fixed to said first drum and the other end of said tape being fixed to said second rotary drum, said tape being wound around at least one of said drums a plurality of turns, an indicating window formed in said television receiver for indicating one of said plurality of codes and provided in close proximity to the surface of said channel indicating tape wound around said first drum so as to make one of said plurality of codes easily visible, and means for indicating a channel number representing a selected channel of a plurality of channel indicating codes visibles in said indicating window at every selected stop position of said channel selection shaft of said detent tuner.

5. A channel indicator for use in a television receiver comprising a first rotary drum provided with an axially aligned shaft and a plurality of peripheral gear teeth formed integral with said first rotary drum, a second rotary drum provided with an axially aligned shaft and a plurality of peripheral gear teeth formed integrally with said second rotary drum, an idle gear interposed between said peripheral gear teeth of said first and second rotary drums and in engagement with said peripheral gear teeth of both of said drums so that the drums rotate in the same direction, a detent tuner provided with a channel selection shaft having a stop position corresponding to each television channel, a second pair of intermeshing gears, means for transmitting a rotation of said channel selection shaft to said first and second rotary drums by means of said second pair of intermeshing gears, each gear of said second pair of intermeshing gears being directly coupled to one of said axially aligned shafts about said one of said first and second rotary drums and to said channel selection shaft selectively, a channel indicating tape on which a plurality of codes representing channel numbers are printed in equidistantly-spaced-apart relation, one end of said tape being fixed to said first drum and the other end of said tape being fixed to said second rotary drum, said tape being wound around at least one of said drums a plurality of times, an indicating window formed in said television receiver for indicating one of said plurality of codes and provided in close proximity to the surface of said channel indicating tape wound around the first drum so as to make one of said plurality of codes easily visible, and means for indicating a channel number representing a selected channel of the plurality of channel indicating codes visibles in said indicating window at every selected stop position of said channel selection shaft of said detent tuner.

* * * * *